(12) United States Patent
Lam

(10) Patent No.: US 12,180,716 B2
(45) Date of Patent: Dec. 31, 2024

(54) ASSEMBLY OF PREFABRICATED WALL MODULAR DECORATION AND ITS PRODUCTION AND INSTALLATION METHOD

(71) Applicant: Channel Universal Limited, WanChai (HK)

(72) Inventor: Yau Cheong Lam, WanChai (HK)

(73) Assignee: CHANNEL UNIVERSAL LIMITED, Wanchai (HK)

( * ) Notice: Subject to any disclaimer, the term of this patent is extended or adjusted under 35 U.S.C. 154(b) by 252 days.

(21) Appl. No.: 17/898,702

(22) Filed: Aug. 30, 2022

(65) Prior Publication Data

US 2023/0088514 A1    Mar. 23, 2023

(30) Foreign Application Priority Data

Sep. 23, 2021   (CN) .......................... 202111113788.3

(51) Int. Cl.
   *B32B 41/00*    (2006.01)
   *B32B 7/12*     (2006.01)
   *E04F 13/08*    (2006.01)

(52) U.S. Cl.
   CPC ............ *E04F 13/0887* (2013.01); *B32B 7/12* (2013.01); *E04F 13/0866* (2013.01); *B32B 2307/102* (2013.01); *B32B 2451/00* (2013.01)

(58) Field of Classification Search
   CPC .............. E04F 13/0887; E04F 13/0866; E04F 2290/041; E04F 13/0885; E04F 13/0862; E04F 13/0875; B32B 7/12; B32B 2307/102; B32B 2451/00; B32B 3/12; B32B 5/02; B32B 5/18; B32B 2266/0235; B32B 5/245; B32B 9/002; B32B 9/005; B32B 9/042; B32B 9/045; B32B 9/046; B32B 21/02; B32B 25/00; B32B 25/10; B32B 27/12; B32B 27/304
   USPC ..................... 156/60, 64, 350, 351, 378, 379
   See application file for complete search history.

(56) References Cited

U.S. PATENT DOCUMENTS

| | | | |
|---|---|---|---|
| 6,367,218 B2 * | 4/2002 | Lombardo | E04F 13/0882 52/391 |
| 10,132,086 B2 * | 11/2018 | Wood | E04F 13/0882 |
| 10,883,266 B2 * | 1/2021 | Geer | E04B 1/86 |

* cited by examiner

*Primary Examiner* — Michael N Orlando
*Assistant Examiner* — Joshel Rivera
(74) *Attorney, Agent, or Firm* — MUNCY, GEISSLER, OLDS & LOWE, P.C.

(57) ABSTRACT

The present invention discloses an assembly of prefabricated wall modular decoration, comprising a conventional decorative material, a plate, a movable laminating layer and a protective layer. The conventional decorative material being mounted on the surface of the plate, a number of movable laminating layers being evenly spaced between the plate and the protective layer making a sound-insulated air gap between them, and the protective layer being mounted on the surface of the wall. The present invention also discloses an installation method for the assembly above. Due to the traditional decorative material, the plate, the active lamination layer, and the protective layer of the present invention are set to be installed on the wall in turn, together with the sound-insulated air gap within the structure, which is not only simple to manufacture and easy to install, but also has better sound absorption performance which could reduce the noise nuisance.

1 Claim, 2 Drawing Sheets

ASSEMBLY OF PREFABRICATED WALL MODULAR DECORATION AND ITS PRODUCTION AND INSTALLATION METHOD

FIELD OF THE INVENTION

The present invention relates to the field of building construction technology, specifically, it is an assembly of prefabricated wall modular decoration and its production and installation method.

BACKGROUND OF THE INVENTION

As is known to all, paint, wallpaper, fabric, leather, ceramic tiles and other conventional wall decoration materials, all need to consume a lot of manpower, time and ancillary materials for wall finishing and preparatory processes, before they can be framed, coated, wrapped, nailed, laminated and other processes; and massive manual processes are often susceptible by different construction sites, any slight mistake, will cause material scraping, rebuilding, repurchasing, etc. losses; workers' experience and craftsmanship are especially the keys to the quality and aesthetics for the product, however, the workers' experience, ability and craftsmanship in the market are varied which often leading to the different results and quality with using the same decorative materials, so there is no any guarantee for the consumers.

In addition, for meeting the needs of dense populations, most of the modern buildings are designed to maximize the interior space, so the partition walls of the buildings are usually made with thin materials, resulting in inadequate sound insulation and noise nuisance from neighbors from time to time.

Therefore, there is a need for improving and enhancing the existing technology.

SUMMARY OF THE INVENTION

In response to the shortcomings of the existing technology, the present invention provides an assembly of prefabricated wall modular decoration which produces prefabricated components with the advantages of being easy to install, sound absorption, catering environment, and being reusable, by using conventional wall decorative materials such as paint, wallpaper, fabric, leather, ceramic tiles, etc., to unify the production quality and add sound-absorbing elements, it could save a lot of manpower, time and consumption of ancillary materials, and provide consumers with a time-saving and noise reduction option.

The present invention also provides a method for producing and installing an assembly of prefabricated wall modular decoration.

In order to achieve the above object, the technical solutions used in the present invention are:
The assembly of the prefabricated wall modular decoration comprising a conventional decorative material, a plate, a movable laminating layer and a protective layer; the conventional decorative material is mounted on the surface of the plate, a number of movable laminating layers being evenly spaced between the plate and the protective layer making a sound-insulated air gap between them, wherein the protective layer is mounted on the surface of the wall.

As a further solution of the present invention, the movable laminating layer includes a first latex layer, a second latex layer, a first plasticized stem locking layer, and a second plasticized stem locking layer; wherein a first double-sided sticker is disposed of between the first latex layer and the plate, a second double-sided sticker is disposed of between the first latex layer and the first plasticized stem locking layer and the first plasticized stem locking layer is combined with the second plasticized stem locking layer, a third double-sided sticker is disposed of between the second plasticized stem locking layer and the second latex layer, and a fourth double-sided sticker is disposed of between the second latex layer and the protective layer.

As a further solution of the present invention, the conventional decorative material includes paint, wallpaper, fabric, artificial leather, stone, or ceramic tiles.

As a further solution of the present invention, the plate includes but is not limited to plywood, medium fiber board, high fiber board, polyvinyl chloride board, foamed polyvinyl chloride board, honeycomb board, plastic plywood, melamine board, etc.

A prefabricated installation method for the assembly of prefabricated wall modular decoration as described above, comprising the steps of:
S1. editing, typesetting and making construction plans in accordance with the dimensions of the walls to make a modular splicing plan of the prefabricated wall decorative assembly;
S2. cutting the plates into specified sizes in accordance with the modular splicing plan and marking them with label sequentially, in order to ensure that the finished products are easy to assemble and install in accordance with the plan;
S3. adding and mixing additives with silver ions or copper ions antibacterial function in the liquefied state of raw materials in a conventional decorative materials manufacturing process, so that the surface of conventional decorative materials has an antibacterial function after forming;
S4. applying or laying conventional decorative materials, which already have silver or copper ions attached, on the plates;
S5. laminating the first double-sided sticker onto the first latex layer, then laminating the second double-sided sticker between the first latex layer and the first plasticized stem locking layer, laminating the fourth double-sided sticker onto the second latex layer, then laminating the third double-sided sticker between the second latex layer and the second plasticized stem locking layer, and finally, the first plasticized stem locking layer and the second plasticized stem locking layer are combined together to form a movable laminating layer, which is cut into a certain size and inlaid or laminated to the bottom of the plate at uniform intervals;
S6. coating the wall surface with at least two protective layers to increase the bonding capability of the wall surface; and
S7. laminating the finished product to the protective layer in accordance with the modular splicing plan, and a sound-insulated air gap of 5-6 mm is formed between the plate and the protective layer.

In comparison with the prior art, the benefits of the present invention are that:
due to the above technical solutions, the conventional decorative materials, plates, movable laminating layer and protective layer are installed on the wall in turn, and the sound-insulated air gap is formed between the plates and the protective layer, which is not only easy to manufacture and install, but also has better sound-absorbing performance which reduces noise nuisance.

Each number in the attached drawings is: (1) conventional decorative material, (2) plate, (3) first double-sided sticker, (4) first latex layer, (5) second double-sided sticker, (6) first plasticized stem locking layer, (7) movable laminating layer, (8) wall, (9) protective layer, (10) sound-insulted air gap, (11) second plasticized stem locking layer, (12) third double-sided sticker, (13) second latex layer, (14) fourth double-sided sticker.

DESCRIPTION OF THE PREFERRED EMBODIMENTS

Figure 1:
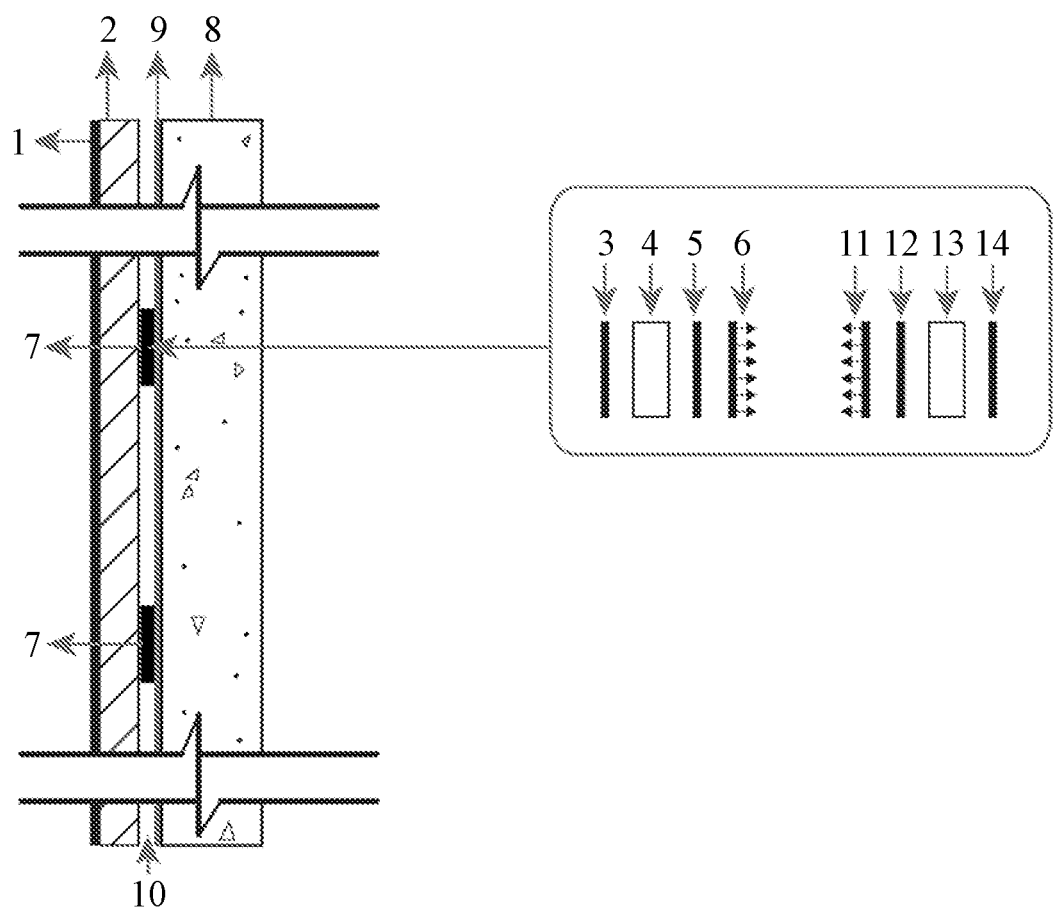
FIG. 1 is a diagram schematically showing the cross-sectional structure of the present invention.

The present invention is further described in detail below together with the accompanying drawings:

Referring to FIG. 1, an assembly of the prefabricated wall modular decoration of the present invention comprising a conventional decorative material 1, a plate 2, a movable laminating layer 7 and a protective layer 9; the conventional decorative material 1 includes paint, wallpaper, fabric, artificial leather, stone or ceramic tiles, and the plate 2 comprises but not limited to plywood, medium fiber board, high fiber board, polyvinyl chloride board, foamed polyvinyl chloride board, honeycomb board, plastic plywood, melamine board. The conventional decorative material 1 is mounted on the exterior surface of the plate 2, a number of movable laminating layers 7 being evenly spaced between the plate 2 and the protective layer 9 forming a sound-insulated air gap between them, wherein said protective layer 9 is mounted on the surface of the wall 8. The movable laminating layers 7 include a first latex layer 4, a second latex layer 13, a first plasticized stem locking layer 6, and a second plasticized stem locking layer 11; wherein a first double-sided sticker 3 is disposed of between the first latex layer 4 and the plate 2, a second double-sided sticker 5 is disposed of between the first latex layer 4 and the first plasticized stem locking layer 6 and the first plasticized stem locking layer 6 is combined with the second plasticized stem locking layer 11, a third double-sided sticker 12 is disposed of between the second plasticized stem locking layer 11 and the second latex layer 13, and a fourth double-sided sticker 14 is disposed of between the second latex layer 13 and the protective layer 9.

Figure 2:
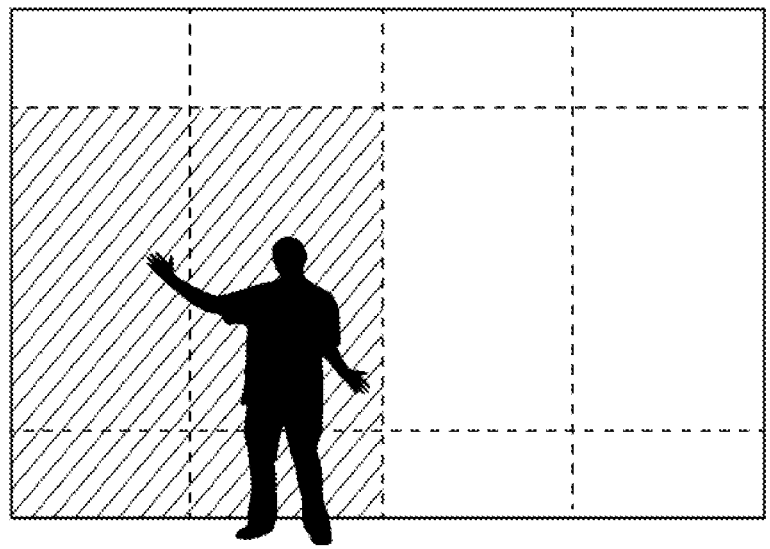
FIG. 2 is a diagram schematically showing the installation of the present invention.

Referring to FIG. 2, a prefabricated installation method of the assembly of prefabricated wall modular decoration as described above, comprising the steps of:

S1. editing, typesetting and making construction plans in accordance with the dimensions of the walls to make a modular splicing plan of the prefabricated wall decorative assembly; for example, for a wall 4.8 m wide by 2.4 m high, plan four plates of 1.18 m×2.38 m and add a hemmed face material with a thickness of approximately 1 mm;

S2. cutting the plates, including but not limited to plywood, medium fiber board, high fiber board, polyvinyl chloride board, foamed polyvinyl chloride board, honeycomb board, plastic plywood, melamine board, into specified sizes in accordance with the modular splicing plan and marking them with label sequentially, in order to ensure that the finished products are easy to assemble and install in accordance with the plan;

S3. adding and mixing additives with silver ions or copper ions antibacterial function in the liquefied state of raw materials in a conventional decorative materials 1 manufacturing process, so that the surface of conventional decorative material has an antibacterial function after forming; its principle is as follows: 1. positively charged silver or copper ions will adsorb to each other when they come into contact with microbial cells that all are negatively charged; 2. Silver ions pierce the exterior of cells to destroy cell DNA and inhibit the formation of the protein, so that cells cannot metabolize and reproduce until they die, thus achieving a sterilizing effect. 3. when the cells lose activity, the silver or copper ions leave and will continue to be antibacterial with continuous antibacterial effect and without toxicity and side effects;

S4. applying or laying traditional decorative materials 1 such as paint, wallpaper, fabric, leather, artificial leather, stone, or ceramic tile, which already have silver ions or copper ions attached, on selected plates 2 by mounting, oil coating, matting, laminating, wrapping and other processes;

S5. laminating the first double-sided sticker 3 with a dynamic tensile force of 60N/cm$^2$ or more onto the first latex layer 4 with a dynamic tensile force of 80N/cm$^2$ or more, then laminating the second double-sided sticker 5 with a dynamic tensile force of 60N/cm$^2$ or more between the first latex layer 4 and the first plasticized stem locking layer 6 with 160-250 plastic stems per square inch, and laminating the fourth double-sided sticker 14 with a dynamic tensile force of 80N/cm$^2$ or more onto the second latex layer 13, and laminating the third double-sided sticker 12 with a dynamic tensile force of 60N/cm$^2$ or more between the second latex layer 13 and the second plasticized stem locking layer 11 with 160-250 plastic stems per square inch, finally, the first plasticized stem locking layer 6 and the second plasticized stem locking layer 11 are combined together to form a movable laminating layer 7 with a dynamic pressing force of 15.2N/cm$^2$, a dynamic tensile force of 29.6N/cm$^2$, and an oblique deprivation force of 15N/cm$^2$, and the movable laminate layer 7 is cut into a certain size and inlaid or laminated to the bottom of the plate 2 at uniform intervals; wherein the first plasticized stem locking layer and the second plasticized stem locking layer are made of a group of plastic with 160-250 stems per square inch and their ends are formed in a shape of "T" or "↑", two pieces are assembled and interlocked with each other;

S6. on the flattened wooden or cement or plasterboard wall 8 surface, coating with at least two layers of protective layer 9 mixed with drying oil, resin and thinner or solubility desiccant to enhance the bonding capability of the wall surface; the following equation can be used as a reasonable estimate of the surface bonding capability:

$$\gamma = \frac{(z_\sigma - z_\beta)\frac{W_{AA}}{2}}{a_0}$$

wherein γ is the surface energy density of the liquid, $z_o$ and $z_β$ are the coordination numbers corresponding to the surface and body regions of the material which are equal to 5 and 6 respectively; $a_0$ is the surface area of a single molecule and $W_{AA}$ is the pairwise intermolecular energy; and S7. laminating the finished product to the wall 8 that has been leveled and treated in accordance with the modular splicing plan, and a 5-6 mm sound-insulted air gap 10 will be formed between the plate 2 and the protective layer 9. According to the modular assembly structure, the finished product will be hung on the wall, and the antibacterial function is characterized by silver or copper ion on the material surface in accordance with the specifications, so that the purpose of antibacterial function and repeatable removal and installation for use is achieved.

The present invention uses conventional wall decoration materials such as paint, wallpaper, fabric, leather, ceramic tiles, etc., to make it into prefabricated components that are easy to install, with sound-insulted air gaps, meet environmental protection and are reusable, and it unifies the production quality and adds sound absorption elements in the production procedure which saves massive manpower, time and consumption of ancillary materials, providing consumers with a time-saving and noise reduction option.

The above are only preferred embodiments of the present invention, and are not intended to limit the present invention in any form. Although the present invention has been disclosed as above with preferred embodiments, it is not used to limit the invention. Any person skilled in the art can use the technical content revealed above to make some changes or modify the equivalent embodiments for equivalent changes without departing from the technical solution of the present invention, but any simple modifications, equivalent changes and modifications made to the above embodiments according to the technical substance of the present invention still fall within the scope of the technical solution of the present invention.

What is claimed is:

1. A production and installation method for assembly of a prefabricated wall modular decoration, comprising:
    S1. editing, typesetting and making construction plans in accordance with dimensions of a wall to make a modular splicing plan for a prefabricated wall decorative assembly;
    S2. cutting plates into specified sizes in accordance with the modular splicing plan and marking each plate with a label, sequentially, to assist with assembly and installation of a finished product in accordance with the modular splicing plan;
    S3. adding and mixing additives with silver ions or copper ions, having_antibacterial function, to the liquefied state of raw materials in a conventional decorative materials manufacturing process, so that the surface of the conventional decorative materials has an antibacterial function after forming;
    S4. applying or laying the conventional decorative materials, which have silver or copper ions attached, on the plates;
    S5. laminating a first double-sided sticker onto a first latex layer, then laminating a second double-sided sticker between the first latex layer and a first plasticized stem locking layer, laminating a fourth double-sided sticker onto a second latex layer, then laminating a third double-sided sticker between the second latex layer and a second plasticized stem locking layer, and finally, the first plasticized stem locking layer and the second plasticized stem locking layer are combined together to form a movable laminating layer, which is cut into a certain size and inlaid or laminated to the bottom of the plate at uniform intervals;
    S6. coating the wall surface with at least two protective layers to increase bonding capability of the wall surface; and
    S7. laminating the finished product to the protective layer in accordance with the modular splicing plan, wherein a sound-insulated air gap of 5-6 mm is formed between the plate and the protective layer.

* * * * *